United States Patent [19]

D'Alelio

[11] 4,055,543

[45] Oct. 25, 1977

[54] CHAIN-EXTENDING SCHIFF BASE TERMINATED POLYIMIDES AND METHOD OF PREPARATION

[76] Inventor: Gaetano Francis D'Alelio, 2011 E. Cedar St., South Bend, Ind. 46617

[21] Appl. No.: 581,095

[22] Filed: May 27, 1975

Related U.S. Application Data

[63] Continuation-in-part of Ser. No. 363,800, May 25, 1973, Pat. No. 3,998,786, and a continuation-in-part of Ser. No. 363,801, May 25, 1973, Pat. No. 3,897,395.

[51] Int. Cl.$^2$ .................. C08G 73/10; C08G 73/12
[52] U.S. Cl. .................. 260/47 CP; 260/46.5 E; 260/47 UA; 260/49; 260/63 P; 260/65; 260/78 UA; 260/78 TF; 260/78.41; 428/474
[58] Field of Search ............ 260/47 CP, 49, 65, 63 R, 260/78 TF, 47 UA, 78 UA, 78.41, 46.5 E

[56] References Cited

U.S. PATENT DOCUMENTS

| | | | |
|---|---|---|---|
| 3,864,309 | 2/1975 | Bilow et al. | 260/47 UA |
| 3,890,274 | 6/1975 | D'Alelio | 260/47 CP |
| 3,943,107 | 3/1976 | Seltzer et al. | 260/65 |

*Primary Examiner*—Lester L. Lee

[57] ABSTRACT

Aromatic polyimides with Schiff base end groups are chain-extended (molecular weight increase) by heating the polyimides, preferably in the presence of Lewis acid salts as catalyst. Molecular weights are increased with little or no by-product formation. The polyimides can be shaped and formed prior to the polymerization.

The aromatic polyimides appropriate for chain-extending are formed by the reaction of aromatic dianhydrides, aromatic diamines and a Schiff base monoamine such as p-amino-benzylidene-aniline, p-amino-benzylidene-4-vinylaniline and p-aminobenzylidine-4-ethynylaniline.

14 Claims, No Drawings

CHAIN-EXTENDING SCHIFF BASE TERMINATED POLYIMIDES AND METHOD OF PREPARATION

RELATIONSHIP TO OTHER APPLICATIONS

This application is a continuation-in-part of copending applications Ser. No. 363,800 now U.S. Pat. No. 3,998,786 and Ser. No. 363,801, now U.S. Pat. No. 3,897,395 both filed May 25, 1973.

BACKGROUND OF THE INVENTION

1. Field of the Invention

This invention relates to processes for preparing polymeric materials and polymeric materials so prepared and more particularly to processes for converting low molecular weight polyimides, with minimum elimination of by-products, to high molecular weight, thermally-stable polymers.

2. Prior Art

The synthesis in recent years of a number of thermally-stable polymers (e.g. polyimides) has supplied materials whose properties allow them to meet some critical end-use requirements. Their application to other uses is limited by a number of their specific properties, among which is intractability. This necessitates their use in dilute solutions in such exotic solvents as sulfuric acid, for example, to be spun into fibers. This excludes their use in laminations and in moldings. In addition, once isolated from the solvent, high temperatures are required to convert them to the fully condensed or cured final state. This curing is accompanied by the elimination of volatile by-products.

In contrast, polymers containing oxirane structures, such as epoxy-phenolics, can be cured at reasonably low temperatures with a minimum of by-products. However, the thermal stabilities of the oxirane polymers fall below those, for example, of the stable polybenzimidazoles. Thus, it is desirable to prepare oligomers which will propagate to higher molecular weights with minimum volatile elimination at relatively low temperatures and which will possess thermal stabilities reasonably higher than epoxy phenolics, preferably approaching the stabilities demonstrated by the polyimides and similar polyheterocyclics.

SUMMARY OF THE INVENTION

According to the present invention there is provided a polymeric chain-extending process comprising: heating a polyimide of the formula:

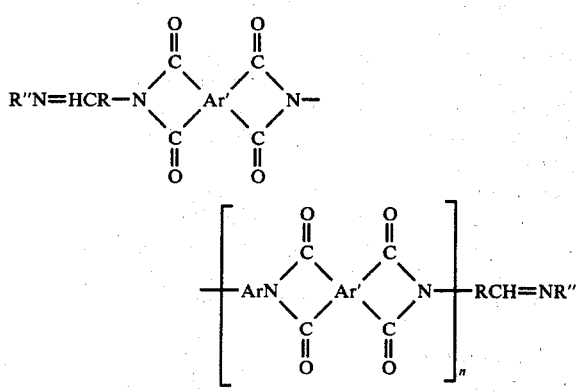

wherein

Ar' is a tetravalent aromatic organic radical, the four carbonyl groups being attached directly to separate carbon atoms and each pair of carbonyl groups being attached to adjacent carbon atoms in the Ar' radical, Ar is a divalent aromatic organic radical, R is a hydrocarbon radical of 1 to 12 carbon atoms, and R" is a hydrocarbon radical of 1 to 12 carbon atoms, and n is a positive integer of at least one.

There is also provided a cross-linked polymer prepared by the above-described process.

DETAILED DESCRIPTION OF THE INVENTION

The polyimides used in the process of the invention are prepared by reacting $m + 1$ moles of an aromatic dianhydride, $m$ moles of an aromatic diamine and 2 moles of a Schiff base organic monoamine to form oligomeric or higher molecular weight polyimides. The letter $m$ is a positive integer which is as high as $n$ in the above-described formula.

The aromatic dianhydride has the general formula:

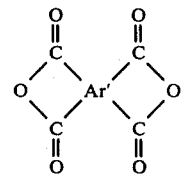

wherein Ar' is a tetravalent aromatic organic radical, preferably containing at least one ring of six carbon atoms, said ring characterized by benzenoid unsaturation, the four carbonyl groups being attached directly to separate carbon atoms and each pair of carbonyl groups being attached to adjacent carbon atoms in the Ar' radical. Any of the aromatic tetracarboxylic acid dianhydrides known in the prior art can be used. Among the useful dianhydrides are 3,3',4,4'-benzophenonetetracarboxylic acid dianhydride, pyromellitic dianhydride, 2,3,6,7-naphthalene tetracarboxylic acid dianhydride, 3,3',4,4'-diphenyl tetracarboxylic acid dianhydride, 1,2,5,6-naphthalene tetracarboxylic acid dianhydride, 2,2',3,3'-diphenyl tetracarboxylic acid dianhydride, 2,2-bis(3,4-dicarboxyphenyl)propane dianhydride, 3,4,9,10-perylene tetracarboxylic acid dianhydride, bis(3,4-dicarboxyphenyl)ether dianhydride, naphthalene-1,2,4,5-tetracarboxylic acid dianhydride, naphthalene-1,4,5,8-tetracarboxylic acid dianhydride, decahydronaphthalene-1,4,5,8-tetracarboxylic acid dianhydride, 4,8-dimethyl-1,2,3,5,6,7-hexahydronaphthalene-1,2,5,6-tetracarboxylic acid dianhydride, 2,6-dichloronaphthalene-1,4,5,8-tetracarboxylic acid dianhydride, 2,7-dichloronaphthalene-1,4,5,8-tetracarboxylic acid dianhydride, 2,3,6,7-tetrachloronaphthalene-1,4,5,8-tetracarboxylic acid dianhydride, phenanthrene-1,8,9,10-tetracarboxylic acid dianhydride, cyclopentane-1,2,3,4-tetracarboxylic acid dianhydride, pyrrolidine-2,3,4,5-tetracarboxylic acid dianhydride, pyrazine-2,3,5,6-tetracarboxylic acid dianhydride, 2,2-bis(2,3-dicarboxyphenyl)propane dianhydride, 1,1-bis(2,3-dicarboxyphenyl)ethane dianhydride, 1,1-bis-(3,4-dicarboxyphenyl)ethane dianhydride, bis(2,3-dicarboxyphenyl)methane dianhydride, bis(3,4-dicarboxyphenyl)methane dianhydride, bis(3,4-dicarboxyphenyl)- sulfone dianhydride, and benzene-1,2,3,4-tetracarboxylic acid dianhydride. The first three mentioned dianhydrides are preferred.

Aromatic diamines useful in preparing the starting polyimides and in the process have the general formula:

wherein Ar is a divalent aromatic organic radical. Preferred aromatic diamines are those wherein Ar is a divalent benzenoid radical selected from the group consisting of

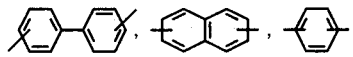

and multiples thereof connected to each other by $R^{IV}$, e.g.,

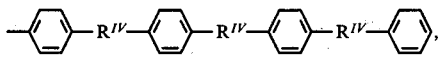

wherein $R^{IV}$ is an alkylene chain of 1—3 carbon atoms, —CH=CH—,

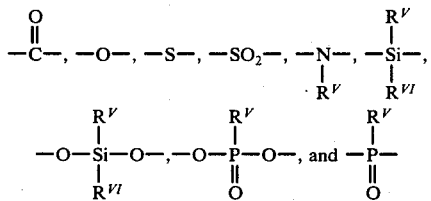

wherein $R^V$ and $R^{VI}$ are each selected from the group consisting of alkyl and aryl containing one to six carbon atoms, e.g., methyl, ethyl, hexyl, n-butyl, i-butyl and phenyl.

Examples of aromatic diamines which are suitable for use in the present invention are 4,4'-diaminodiphenyl propane, 4,4'-diamino-diphenyl methane, benzidine, 3,3'-dichlorobenzidine, 4,4'-diamino-diphenyl sulfide, 3,3'-diamino-diphenyl sulfone, 4,4'-diamino-diphenyl sulfone, 4,4'-diamino-diphenyl ether, 1,5-diamino naphthalene, 4,4'-diamino-diphenyl diethylsilane, 4,4'-diamino-diphenyl diphenylsilane, 4,4'-diamino-diphenyl ethyl phosphine oxide, 4,4'-diaminodiphenyl phenyl phosphine oxide, 4,4'-diamino-diphenyl N-methyl amine, 4,4'-diamino-diphenyl N-phenyl amine and mixtures thereof. 3,3'-dimethyl-4,4'-diaminodiphenylmethane, 3,3'-diethyl-4,4'-diaminodiphenylmethane, 3,3'-dimethoxy-4,4'-diaminodiphenylmethane, 3,4'-diethoxy-4,4'-diaminodiphenylmethane, 3,3'-dichloro-4,4',4,4'-diaminodiphenylmethane, 3,3'-dibromo-4,4'-diaminodiphenylmethane, 3,3'-dicarboxy-4,4'-diaminophenylmethane, 3,3'-dihydroxy-4,4'-diaminophenylmethane, 3,3'disulpho-4,4'-diaminodiphenylmethane, 3,3'-dimethyl-4,4'-diaminodiphenylether, 3,3'-diethyl-4,4'-diaminodiphenylether, 3,3'-dimethoxy-4,4'-diaminodiphenylether, 3,3'-diethoxy-4,4'-diaminodiphenylether, 3,3'-dichloro-4,4'-diaminodiphenylether, 3,3'-dibromo-4,4'-diamino diphenylether, 3,3'-dicarboxy-4,4'-diaminodiphenylether, 3,3'-dihydroxy-4,4'-diaminodiphenylether, 3,3'-disulfo-4,4'-diaminodiphenylether, 3,3'-dimethyl-4,4'-diaminodiphenylsulfide, 3,3'-diethyl-4,4'-diaminodiphenylsulfide, 3,3'-dimethoxy-4,4'-diaminodiphenylsulfide, 3,3'-diethoxy-4,4'-diaminodiphenylsulfide, 3,3'-dichloro-4,4'-diaminodiphenylsulfide, 3,3'-dibromo-4,4'-diaminodiphenylsulfide, 3,3'-dicarboxyl-4,4'-diaminodiphenylsulfide, 3,3'-dihydroxy-4,4'-diaminodiphenylsulfide, 3,3'-disulfo-4,4'-diaminodiphenylsulfide, 3,3'-dimethyl-4,4'-diaminodiphenylsulfone, 3,3'-diethoxy-4,4'-diaminodiphenylsulfone, 3,3'-dichloro-4,4'-diaminodiphenylsulfone, 3,3'-dicarboxy-4,4'-diaminodiphenylsulfone, 3,3'-dihydroxy-4,4'-diaminodiphenylsulfone, 3,3'-disulfo-4,4'-diaminodiphenylsulfone, 3,3'-diethyl-4,4'-diaminodiphenylpropane, 3,3'-dimethoxy-4,4'-diaminodiphenylpropane, 3,3'-dibromo-4,4'-diaminodiphenylpropane, 3,3'-dichloro-4,4'-diaminodiphenylpropane, 3,3'-dicarboxy-4,4'-diaminodiphenylpropane, 3,3'-dihydroxy-4,4-diaminodiphenylpropane, 3,3'-disulfo-4,4'-diaminodiphenylpropane, 3,3'-dimethyl-4,4'-diaminobenzophenone, 3,3'-dimethoxy-4,4'-diaminobenzophenone, 3,3'-dichloro-4,4'-diaminobenzophenone, 3,3'-dibromo-4,4'-diaminobenzophenone, 3,3'-dicarboxy-4,4'-diaminobenzophenone, 3,3'-dihydroxy-4,4'-diaminobenzophenone, 3,3'-disulphodiaminobenzophenone, 3,3'-diaminodiphenylmethane, 3,3'-diaminodiphenylether, 3,3'-diaminodiphenylsulfide, 3,3'-diaminodiphenylsulfone, 3,3'-diaminodiphenylpropane, 3,3'-diaminobenzophenone, 2,4-diaminotoluene, 2,6-diaminotoluene, 1-isopropyl-2,4-phenylenediamine, 2,4-diaminoanisole, 2,4-diaminomonochlorobenzene, 2,4-diaminofluorobenzene, 2,4-diaminobenzoic acid, 2,4-diaminophenol, and 2,4-diaminobenzenesulfonic acid, and phenylene diamines. Preferred diamines are 4,4'-oxydianiline, 4,4'-sulfonyldianiline, 4,4'-methylene dianiline, 4,4'-diaminobenzophenone, 4,4'-diaminostilbene and the phenylene diamines.

The polyimide starting materials used in the process of the present invention are prepared according to the azeotroping process described in my copending application Ser. No. 363,800 filed May 25, 1973, the disclosure of which is hereby incorporated by reference. Briefly, the process involves reacting the dianhydride with the diamine in a phenol solvent of the formula

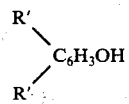

where each R' is hydrogen or a methyl radical in the presence of certain organic azeotroping agents, particularly cyclic hydrocarbons of 6 to 8 carbon atoms and most preferably benzene or toluene until most of the water of reaction is eliminated. A monoamine can also be used under certain conditions. The reaction temperature is less than 140° C. and also should be below the boiling point of the phenol used but higher than the boiling point of the azeotroping agent. The vapor phase temperature lies between that of the water azeotrope and no higher than 95° C. As the water of reaction and azeotroping agent are removed from the reaction mixture, quantities of the azeotroping agent are returned to the reaction mixture so as to maintain the temperature and reaction mixture volume substantially constant. It is preferred that the process be continuous with continuous removal of water and continuous return of azeotroping agent. This is conveniently done by the use of a conventional Dean-Stark trap and condenser wherein after the azeotrope condenses, the water preferably sinks to the bottom of the trap for subsequent removal and the azeotroping agent overflows the trap and returns to the reaction mixture. Initially, the trap is filled with azeotroping agent.

The Schiff base organic monoamine has the formula $H_2NRCH=NR''$ where R is a divalent hydrocarbon radical of 1 to 12 carbon atoms, preferably an aromatic radical, and R'' is a monovalent hydrocarbon radical, preferably an aromatic radical with or without pendant groups having ethylenic or acetylenic unsaturation.

Illustrative examples of R are: $—CH_2—$, $—CH_2CH_2—$, $—C_3H_6$, $—C_8H_{16}—$, $—C_{12}H_{24}—$, $—C_6H_4C_6H_4—$, $—C_6H_4—$, $—C_6H_4O\ C_6H_4—$, $—C_6H_4SO_2C_6H_4—$, $—C_6H_4CH_2C_6H_4—$, $—H_4C_6CH=CH\ C_6H_4—$,

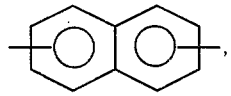

$—CH_2C_6H_4—$,

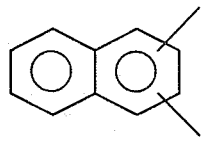

$—CH_2CH_2C_6H_4—$, $—(CH_2)_3C_6H_4—$, $—C_6H_{10}—$, $—C_6H_9(CH_3)—$, and $—C_6H_8—$.

Illustrative examples of R'' are: $—CH_3$, $—C_2H_5$, $—C_3H_7$, $—C_4H_9$, $—C_8H_{17}$, $—C_{12}H_{25}$, $—C_6H_5$, $—C_6H_4—C_6H_5$, $—C_{10}H_7$, $—C_6H_{11}$, $—C_6H_{10}—CH_3$, $—CH_2C_6H_5$, $—C_6H_3Cl_2$, $—C_6H_4O\ C_6H_5$, $—C_6H_4CH=CH_2$ and $—C_6H_4C≡CH$, $—C_6H_4OC_6H_4C≡CH$, $—C_6H_4SO_2C_6H_4C≡CH$.

Specific examples of the monoamines are: $H_2NCH_2CH=NCH_3$, $H_2NC_6H_4CH=NC_6H_5$, $H_2NC_6H_4CH=NC_2H_5$, $H_2NC_6H_4CH=NCH_2C≡CH$, $H_2NC_6H_4OC_6H_4CH=NC_6H_3Cl_2$, $H_2NC_6H_4OC_6H_4CH=NC_6H_4OC_6H_4C≡CCH_3$, $H_2NC_6H_4SO_2C_6H_4CH=NC_6H_4CH=CH_2$, $H_2N\ C_6H_4OC_6H_4CH=NC_6H_4SO_2C_6H_4CH=CH_2$, $H_2NC_6H_4CH=NC_6H_4C≡CC_6H_4$, $H_2NC_{10}H_6CH=NC_6H_4C≡CH$, $H_2NC_6H_4CH=NC_6H_{11}$, $H_2N\ C_6H_4OC_6H_4CH=NC_6H_4SO_2C_6H_4C≡CH$, and the like.

Preferred monoamines are the amino-benzylidene anilines, $H_2NC_6H_4CH=NR''$ where R'' is $—C_6H_5$, $—C_6H_4CH=CH_2$ and $—C_6H_4C≡CH$. In these amino-benzylidene anilines, the substitution on the benzene ring can be ortho, meta or para, but in general, para and meta substitutions are preferred.

The polyimides prepared by the above-described process will have the formula described previously. However, these polyimides can also be prepared by prior conventional methods by reacting the aromatic dianhydride with the aromatic diamine and Schiff base organic monoamine in a suitable solvent. The amic acid intermediate is then dehydrated thermally or with acetic anhydride.

The chain-extending process used to make high molecular weight, cross-linked polyimides occurs by the self-coupling of the polyimides described in the aforesaid formula. Initiation occurs thermally by heating at a temperature in the range of about 150°–450° C., preferably from about 200°–300° C. Preferably, the polyimides are chain-extended by heating them in the presence of a catalytic amount of Lewis acid salt catalyst, usually about 0.15 – 3% by weight (based on the weight of polyimide). The Lewis acid salt catalyst is preferably at least one of $AlCl_3$, $SbCl_3$, $SbCl_5$, $ZnCl_2$, $ZnSO_4$ and copper salts.

The polyimides of the present invention have a number of uses. These include use of the solutions before curing as wire and insulating varnishes and to impregnate fabric substrates used in making flexible and rigid electronic circuit boards and in making structural laminates. The solutions can be used to make fibers and films and as adhesives, particularly for film substrates, useful in aerospace and electronics applications. The powders can be used as molding powders and to make fibers, films and foams.

The invention can be further understood by the following examples in which parts and percentages are by weight unless otherwise indicated.

EXAMPLE 1 a. Preparation of Phenol-Terminated Oligomeric Polyimide (BTAP-4). Reaction of BTCA, SDA-3,3 and p-Aminophenol (5:4:2).

According to the m-cresol:benzene technique there was allowed to react 3,3',4,4'-benzophenonetetracarboxylic acid dianhydride BTCA (6.4446 g., 0.02 mole), 3,3'-sulfonyldianiline SDA-3,3 (3.9730 g., 0.016 mole) and p-aminophenol (0.8730 g., 0.008 mole). There was obtained 10.0418 g. (95%) of a pale yellow powder (BTAP-4) which was soluble in m-cresol, dimethylacetamide DMAC and sulfolane. In hot dioxane BTAP-4 formed a separate oily layer. On a Fisher-Johns melting point apparatus BTAP-4 softened at 210° C., melted at 240°–260° C. and did not harden on being heated at 300° C. for 40 minutes. The lowest temperature at which a sample would melt completely when dropped onto the preheated stage was 250° C.

Analysis: Calc'd. for $C_{145}H_{72}N_{10}O_{35}S_4$: C, 65.90; H, 2.75; N, 5.30; O, 21.19; S, 4.85. Found: C, 65.45; H, 2.88; N, 4.99; O, -----; S, ----. C, 65.43; H, 2.95; N, 5.31; O, -----; S,----.

b. Polymerization of BTAP-4.

A mixture of BTAP-4 with about 10–12% paraformaldehyde and 1–5% lime cures into an insoluble, intractable polymer when heated at the melting point of BTAP-4 on a hot plate.

c. Preparation of Aldehyde-Terminated Oligomer.

When an equivalent molar quantity of p-aminobenzaldehyde, $NH_2C_6H_4CHO$ (0.968 g.) is used instead of the p-aminophenol of (a) of this Example, the corresponding aldehyde-terminated oligomeric imide is obtained.

Similarly, when an equivalent molar amount of p-aminobenzylidene-aniline, $NH_2C_6H_4CH=NC_6H_5$ (1.568 g.) is used instead of the p-aminophenol of (a) of this Example, the corresponding Schiff base-terminated oligomer is obtained. Similarly, when an eqivalent molar amount of p-aminobenzylidene-4,vinylaniline, $H_2NC_6H_4CH=N\ C_6H_4CH=CH_2$ (1.765 g.) or an equivalent molar amount of p-aminobenzylidene-4, ethynylaniline, $H_2NC_6H_4CH=NC_6H_4C≡CH$ (1.75 g.) is used, the corresponding Schiff base-terminated oligomers are obtained, which show faster curing rates than the p-aminobenzylidene aniline. The amino-aryl Schiff bases are readily prepared by the procedure given by Rossi in Gazz. chim., Ital., 44, 263 (1966).

d. Coupling of Schiff Base-Terminated Oligomer.

The Schiff base-terminated oligomers as in (c) of this Example couple similarly to nitrile terminated oligomers. They couple readily when heated in the range of 200°–300° C. for 30 minutes to 2 hours, depending on the nature of the oligomer and of the Schiff base termini. The coupling reaction is accelerated markedly by the addition of catalytic quantities of Lewis acid salts, from about 0.15 to about 3 weight percent, such as $AlCl_3$, $SbCl_3$, $SbCl_5$ or any of the numerous Lewis acid salts well-known as alkylation, isomerization or polymerization catalysts. For reasons of economy and relative ease of handling, zinc chloride, zinc sulfate, and the copper salts are preferred as coupling catalysts for the Schiff base-terminated oligomeric polyimides.

What is claimed is:

1. A polymeric chain-extending process comprising: heating a polyimide, at a temperature in the range of about 150°–450° C, of the formula:

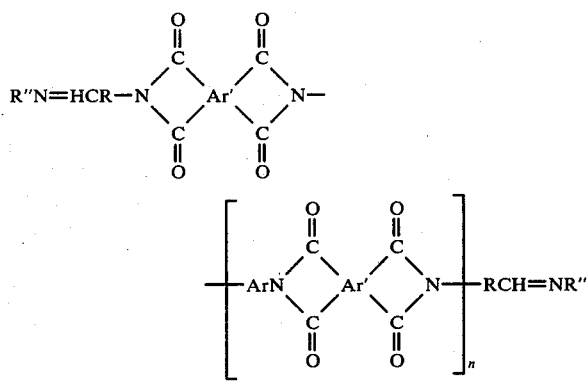

wherein
Ar' is a tetravalent aromatic organic radical, the four carbonyl groups being attached directly to separate carbon atoms and each pair of carbonyl groups being attached to adjacent carbon atoms in the Ar' radical,
Ar is a divalent aromatic organic radical,
R is a hydrocarbon radical of 1 to 12 carbon atoms, and
R" is a hydrocarbon radical of 1 to 12 carbon atoms, and
$n$ is a positive integer of at least one.

2. The process of claim 1 wherein R is an aromatic radical and $n$ is at least 4.

3. The process of claim 1 wherein R" is

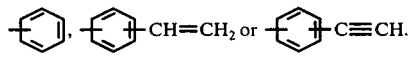

4. The process of claim 1 wherein Ar' is selected from the group consisting of

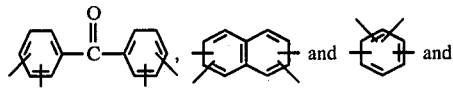

Ar is selected from the group consisting of

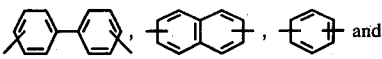

multiples thereof connected to each other by $R^{IV}$, wherein $R^{IV}$ is alkylene of 1 to 3 carbon atoms,

—O—, —S—, —CH=CH—, and —SO$_2$—.

5. The process of claim 1 wherein heating is at a temperature in the range of about 200°–300° C.

6. The process of claim 1 wherein the heating is conducted in the presence of about 0.15 –3% by weight of a Lewis acid salt catalyst.

7. The process of claim 6 wherein the Lewis acid salt catalyst is at a concentration of about 0.15-3% by weight of the polyimide, and the salt is selected from the group consisting of $AlCl_3$, $SbCl_5$, $ZnCl_2$, $ZnSO_4$ and copper salts.

8. A polymeric chain-extending process comprising: heating a polyimide at a temperature in the range of about 150°–450° C. in the presence of about 0.15-3% by weight, based on the weight of the polyimide, of a Lewis acid salt catalyst, said polyimide of the formula:

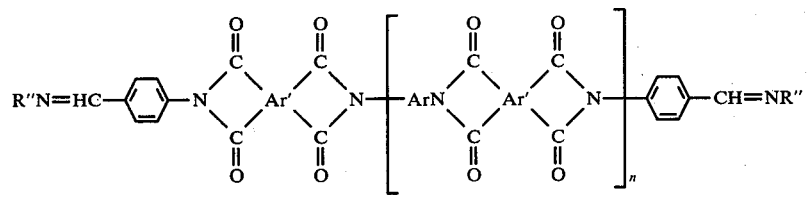

wherein
Ar' is a tetravalent aromatic organic radical, the four carbonyl groups being attached directly to separate carbon atoms and each pair of carbonyl groups being attached to adjacent carbon atoms in the Ar' radical,
Ar is a divalent aromatic organic radical,

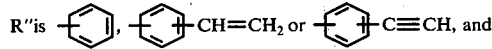

$n$ is a positive integer from 1 to 20.

9. The process of claim 8 wherein Ar' is selected from the group consisting of

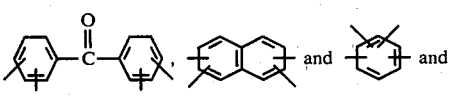

Ar is selected from the group consisting of

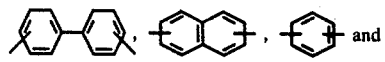 and multiples thereof connected to each other by $R^{IV}$, wherein $R^{IV}$ is alkylene of 1 to 3 carbon atoms,

—O—, —S—, —CH=CH—, and —SO$_2$—.

10. The process of claim 8 wherein the Lewis acid salt catalyst is selected from the group consisting of AlCl$_3$, SbCl$_3$, SbCl$_5$, ZnCl$_2$, ZnSO$_4$ and copper salts.

11. A cross-linked polymer prepared by the process of claim 1.

12. A cross-linked polymer prepared by the process of claim 5.

13. A cross-linked polymer prepared by the process of claim 8.

14. A cross-linked polymer prepared by the process of claim 10.

* * * * *